United States Patent
Powell et al.

(10) Patent No.: US 10,794,548 B2
(45) Date of Patent: Oct. 6, 2020

(54) MULTI ORIENTED, POWER SOURCE AGNOSTIC REPLACEMENT FOR LIGHTING ASSEMBLY

(71) Applicant: SignlightsLED, LLC, Anderson, SC (US)

(72) Inventors: Austin McCoy Powell, Granite Falls, SC (US); Ishavarbhal Patel, Pendleton, SC (US); Jimmy Hanvey, Lenoir, NC (US)

(73) Assignee: SignlightsLED, LLC, Anderson, SC (US)

( * ) Notice: Subject to any disclaimer, the term of this patent is extended or adjusted under 35 U.S.C. 154(b) by 75 days.

(21) Appl. No.: 16/522,951

(22) Filed: Jul. 26, 2019

(65) Prior Publication Data

US 2019/0353310 A1   Nov. 21, 2019

Related U.S. Application Data

(63) Continuation of application No. 16/024,256, filed on Jun. 29, 2018, now Pat. No. 10,465,860.
(Continued)

(51) Int. Cl.
| | |
|---|---|
| *F21S 4/00* | (2016.01) |
| *F21K 9/278* | (2016.01) |
| *F21K 9/272* | (2016.01) |
| *F21S 2/00* | (2016.01) |
| *F21Y 103/10* | (2016.01) |
| *F21Y 115/10* | (2016.01) |

(52) U.S. Cl.
CPC .............. *F21K 9/278* (2016.08); *F21K 9/272* (2016.08); *F21S 2/00* (2013.01); *F21Y 2103/10* (2016.08); *F21Y 2115/10* (2016.08)

(58) Field of Classification Search
CPC ................. A61F 5/0102; A61F 5/0123; A61F 2005/0181; A61F 2005/0137; A61F 2005/0174; A61F 2005/0139
USPC ......................................................... 362/225
See application file for complete search history.

(56) References Cited

U.S. PATENT DOCUMENTS

| | | |
|---|---|---|
| 2,342,570 A | 11/1941 | Biller |
| 4,631,450 A | 12/1986 | LAgree et al. |
| (Continued) | | |

FOREIGN PATENT DOCUMENTS

GB          2447257          9/2008

*Primary Examiner* — Ali Alavi
(74) *Attorney, Agent, or Firm* — Kim and Lahey Law Firm, LLC; Douglas W. Kim; Seann P. Lahey

(57) ABSTRACT

This invention is a replacement lighting system for signs that can include a first lighting assembly having LED strips disposed on opposite sides. The lighting assembly can be rotatably attached to the lamp holders. A hub can be removably connected to an external power supply, a first lighting assembly and a second lighting assembly. The lighting system can be used to replace existing lighting such as fluorescent tubes and accompanying ballasts without the need to understand remove or rewire the sign electrical components other than attaching the lighting system to the power source. The lighting assemblies can be rotated in the lamp holders to reduce or remove hot spots or dark areas. Multiple lighting assemblies can be connected end to end and be in electrical communication with the power source without necessarily needing to wire each lighting assembly to the power source.

15 Claims, 18 Drawing Sheets

Related U.S. Application Data

(60) Provisional application No. 62/619,554, filed on Jan. 19, 2018, provisional application No. 62/527,513, filed on Jun. 30, 2017, provisional application No. 62/527,371, filed on Jun. 30, 201.

(56) References Cited

U.S. PATENT DOCUMENTS

| | | |
|---|---|---|
| 5,183,327 A | 2/1993 | Fabbri |
| 6,860,628 B2 | 3/2005 | Robertson et al. |
| 7,114,830 B2 | 10/2006 | Robertson et al. |
| 7,997,770 B1 * | 8/2011 | Meurer ............ F21K 9/272 362/171 |
| 8,502,454 B2 * | 8/2013 | Sadwick ......... H05B 33/0809 315/291 |
| 8,668,361 B2 * | 3/2014 | Hasnain ............ F21V 29/70 362/294 |
| 9,635,727 B2 | 4/2017 | Scape et al. |

* cited by examiner

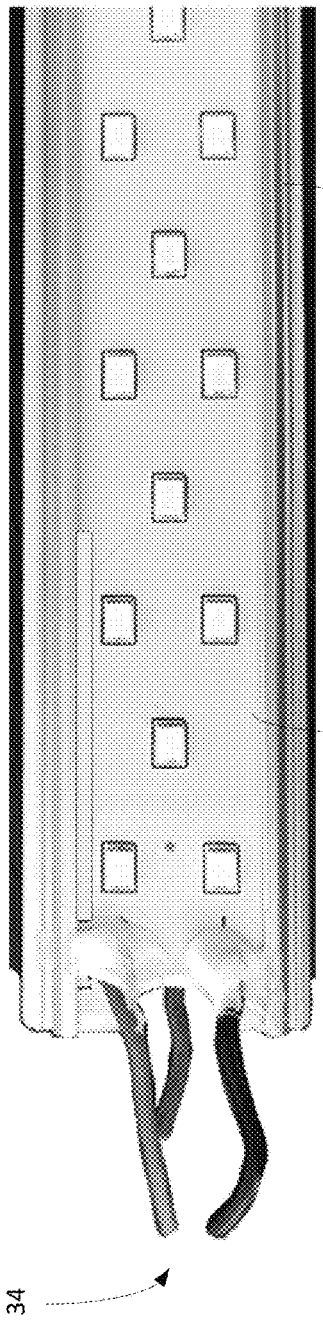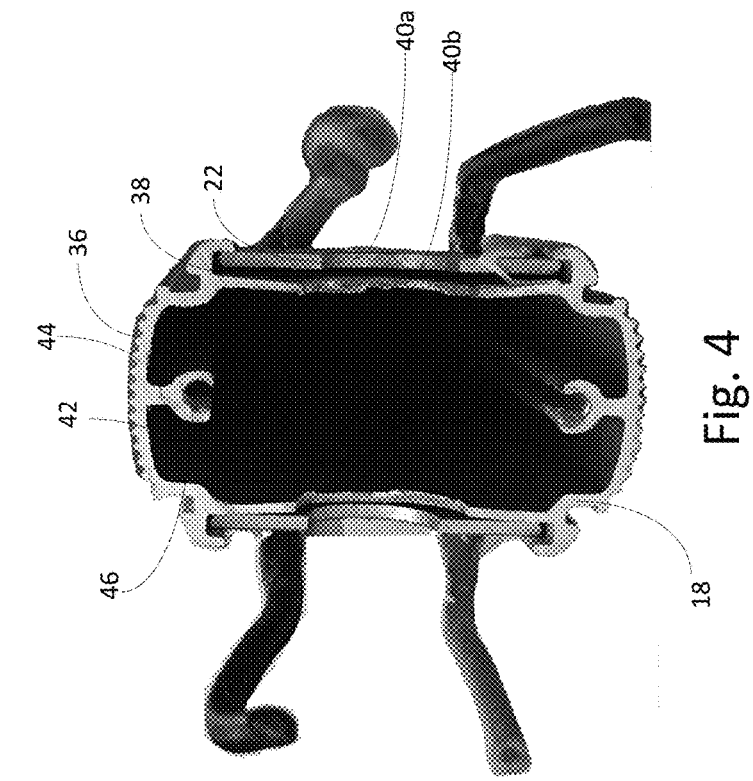

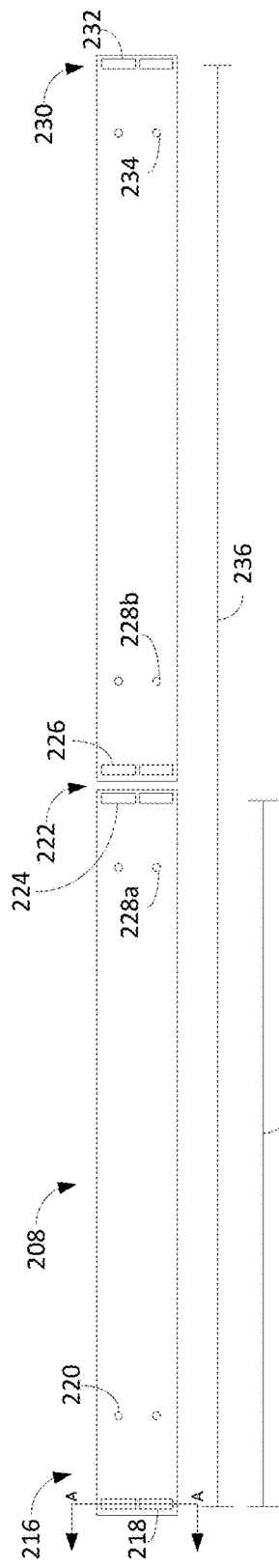
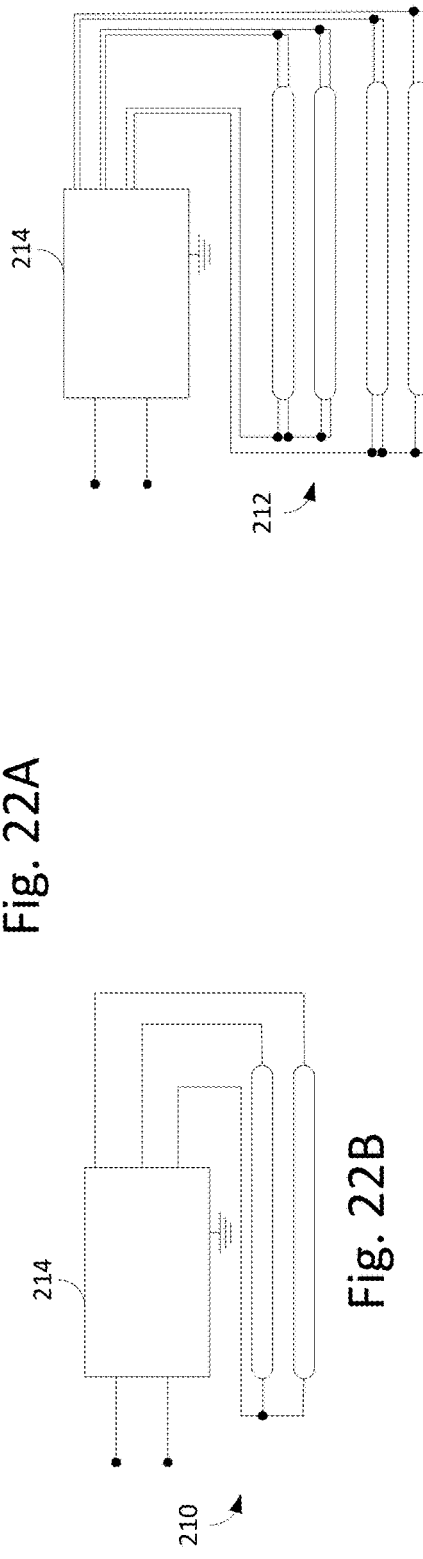
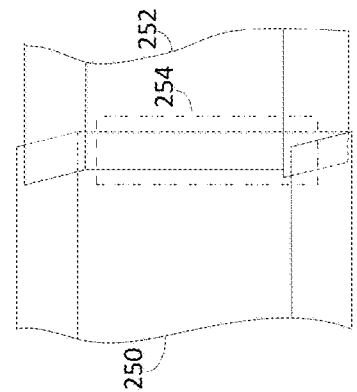
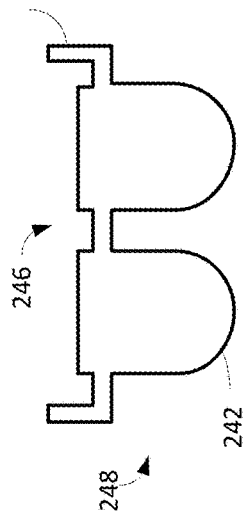
Fig. 22A
Fig. 22B
Fig. 22C
Fig. 22D
Fig. 22E

MULTI ORIENTED, POWER SOURCE AGNOSTIC REPLACEMENT FOR LIGHTING ASSEMBLY

BACKGROUND OF THE INVENTION

1) Field of the Invention

This invention is directed to a power source agnostic replacement for a lighting assembly tube that can be used to replace traditional fluorescent lighting such as in commercial signs.

2) Description of Related Art

A fluorescent lamp, well known in the art, is typically a low-pressure mercury-vapor gas-discharge lamp that uses fluorescence to produce visible light. The lamp is constructed by providing a tube filled with a gas containing low pressure mercury vapor and argon, xenon, neon, or krypton. An electrical current excites vapor which results in a short-wave ultraviolet light. This UV light causes a phosphor coating on the inside of the lamp to glow providing light. Fluorescent lamp tubes are typically straight, have a rounded cross section, and have a length in the range of about 4 inches to about 8 feet. Because each lamp is an enclosed tube typically containing mercury, breaking the tube can release the mercury creating a health danger. Further, some fluorescent tubes emit UV radiation. In one study, UV radiation emitted by fluorescent lighting was found to potentially increase an individual's exposure to carcinogenic radiation by 10 to 30 percent per year which is associated with an increased probability of contracting squamous cell carcinoma. There is also evidence that flickering from fluorescent lamps can cause seizures in patients with photosensitive epilepsy, but there has yet to be any evidence to date attributing seizures to compact fluorescent lamps. Therefore, there have been attempts to replace fluorescent lamps with an economical substitute with reduced risks and equal or improved power consumption characteristics and performance.

For example, U.S. Pat. No. 6,860,628 is directed to an elongated hollow tubular or solid rod lighting device including a plurality of LEDs therewith and appropriate electrical componentry and serving as a direct replacement for a conventional fluorescent light tube in a conventional fluorescent lighting fixture. It is designed to have the appropriate connector pins extending from each end thereof, enabling the device to be installed in a conventional fluorescent lighting fixture with no modification to the fixture. The light may include appropriate electrical componentry such as a step-down transformer to provide the required voltage for the LEDs, either integrally within the light, incorporated in an end cap thereof, or installed separately therefrom in the fixture, as desired. U.S. Pat. No. 7,114,830 is also directed to a LED replacement of fluorescent light without modifications to the fixture.

U.S. Pat. No. 8,502,454 is directed to various apparatuses and methods for replacing a fluorescent lamp with a non-fluorescent tube including an electrical connector adapted to electrically connect to a fluorescent lamp fixture, a DC rectifier connected to the electrical connector, a voltage converter connected to the DC rectifier, and a non-fluorescent light source connected to the voltage converter. The DC rectifier, voltage converter, and non-fluorescent light source are substantially contained within a housing that is physically configured to replace the fluorescent lamp in a fluorescent lamp fixture.

U.S. Pat. No. 8,668,361 is directed to light source that is adapted to replace existing fluorescent tubes in an existing fluorescent light fixture. The light source includes a plurality of LEDs mounted on a heat-dissipating structure, first and second plug adapters that mate with the florescent tube connectors of the fluorescent tube the light source is to replace, and a power adapter that converts power from a fluorescent tube ballast presented on the first and second plug adapters to DC power that powers the LEDs. The light source is powered from the output of the existing fluorescent ballast.

However, these solutions require that the ballast of the fluorescent assembly remain in the structure. Further, the connection of the end of the replacement is required to be in the same pin configuration of the original fluorescent tube. Further, the use of LED lighting is typically done with a LED lighting strip thereby making lighting requirements needing two-sided light projection difficult. Further, given the projection of LED lighting, the ability to rotate and direct the light beam would be advantageous. Fluorescent lighting has 360-degree projection so that the aiming of the light is not needed for surrounding light projection.

Further, the sign or housing that contains the lights can have one or more wiring systems such as when a sign is rewired, the original wiring may not be removed. This results in a situation where the electrician or other individual tasked with installing new lights, repairing lights or signs, replacing lights, or upgrading lights has to first determine the power in, the proper wires to use in a sign housing, and which wires to connect to the new lighting assembly. This task takes time and can result in increased chance of electrical wiring mistakes. Further, there is no standard wiring configuration for sign housings so that the power supply could be located about anywhere within the sign housing from the external power source. It would be advantageous to have a lighting assembly that could serve as a replacement lighting assembly that was not dependent upon any particular power source location or existing wiring system in a sign housing.

Further, traditional lighting housings for fluorescent lights have specific discrete attachment locations for lighting tubes that are affixed to the housing as shown in U.S. Pat. No. 5,183,327. This housing design does not allow for changing the location or the number of lighting assembly in a housing without rewiring the housing itself. For example, in the housing shown in U.S. Pat. No. 5,183,327, there are mounts or connectors for two lighting assembly. To add a third lighting assembly would require that there be an additional set of mounts or connectors attached to the housing and that the existing wiring system be modified to add wiring for the third lighting assembly.

In fluorescent lighting, the technology for lighting tubes was the T12. This technology is on the decline, but nevertheless millions of tubes still exist. Its decline has been accelerated through funding and incentives that shortened the payback period for replacement projects. Further, technology advancements improving rare-earth phosphors and electronic ballasts produced a T8 lamp-ballast system that provides for better color rendering, longer life, and improved efficiency. Further, the T8 lamp can fit into the standard socket configuration of T12 as long as the lamp lengths are the same.

The resulting disadvantage is that the majority of the installed T12 lamps are 8 feet in length, making it troublesome and even dangerous to store, handle and manipulate the T12 lamp or even the T8 lamp as this 8-foot length. For example, the standard door is 80 inches in height or 6 feet 8 inches making manipulating an 8-foot lamp through a door challenging. When a fluorescent lamp is broken, such as the eight-foot T12, there are health risks due to the use of mercury that can exist in vapor and a solid upon breakage. In fact, one study shows that it would take over 20 minutes in a fan ventilated room for the mercury released from a broken fluorescent tube to dissipate to normal levels. Therefore, there is a significant need to reduce the damages of broken T12 lamps.

Additionally, there are some older T12 ballasts that contain PCBs. PCBs are contained within the fluorescent light ballast's capacitors and interior potting material of older magnetic T12 lighting fixtures causing them to be hazardous to human health. Additionally, intact PCB-containing fluorescent light ballasts may emit small amounts of PCBs into the air during normal use of the lighting fixtures. EPA recommends all PCB-containing fluorescent light ballasts be removed from lighting fixtures.

Additionally, Department of Energy regulations have virtually eliminated the new installation of T12 technology so that replacement parts of these existing lighting system as becoming increasingly hard to come by. This reduction in supply has led to increased costs of replacement parts. The result of these health risks, regulatory pressures and financial disincentives is that lighting system has been replaced to eliminate these older systems. For example, United Kingdom Patent GB 2,447,257 discloses a one-piece assembly retro-fit replacement lamp for fluorescent light fitting device with external Light Emitting Diode (LED) light panel and an internally housed LED power supply unit designed to allow the assembly to be installed into an existing fluorescent light fitting to replace the existing light source with a LED light source. Further, U.S. Pat. No. 4,631,450 discloses ballast adaptor circuit which makes it possible to convert a conventional two lamp rapid start T12 ballast for operation of two T8 fluorescent lamps and by means of a simple modification that does not require cutting wires or extensive rewiring of the T12 ballast device.

However, none of these attempts solve the problems with reducing the length of the lamp below 8 feet and improving performance, using the existing reflector and housing and existing power supply. For example, U.S. Pat. No. 2,342,570 discloses fluorescent lighting fixtures of the kind having a lamp circuit; embodied therein including a plurality of lamp holders and a replaceable current-limiting device, commonly called a ballast. The initial designs included gas discharge lamps using simple chokes in order to limit the current of the gas discharge which is now known to have disadvantages. The disadvantages are due, in part, to the operation of lamps at the customary power frequency of 50 or 60 Hz causing the lights to flicker at these frequencies resulting in stroboscopic effects. Patent '570 disclose an attempt to convert these lighting systems to electronic high-frequency operation.

Therefore, it is an object of the present invention to provide for a replacement lighting system for fluorescent tubes regardless of end connectors, length, or orientation.

It is another object of the present invention to provide for a replacement lighting system where the light projection can be configured.

It is another object of the present invention to provide for a lighting system that can be installed regardless of the position within a sign housing or existing wiring system.

It is an object of the present invention to provide for a retrofitting system to replace T12 and other harmful lighting system components with the newer T8 and other more efficient lamps.

It is another object of the present invention to provide for a retrofitting system that can provide for the use of shorter lamps, such as 4 feet, without changing the housing.

It is another object of the present invention to provide for a retrofitting system that is minimally effects by the various components of the original lighting system.

SUMMARY OF THE INVENTION

The present invention is directed to a lighting system that can replace an existing lights and wiring in a sign comprising: a first lighting assembly having a support structure, a cavity defined in the support structure, a first LED strip disposed on a first side of the support structure and a second LED strip disposed on an opposite side of the support structure; an end cap assembly including a fixed cap and a rotatable cap attached to an end of the support structure; an end connector attached to the rotatable cap concealing a pin connector carried by the support structure; a first driver disposed in the cavity and in electrical communications with the first LED strip and the second LED strip; an initial connector configured be connected to an external power supply; a first light connector carried by the support structure and connected to the first driver; a second light connector carried by the support structure and connected to the first driver; first hub removably connected to the initial connector by a first extension cord and removably connected to the first light connecter by a second extension cord; and, a second hub removably connected to the second light connector and a second lighting assembly.

The invention can include an extension cord removably connected between the first hub and the first light connector, an extension cord can be removably connected between the first hub and the initial connector and a cap attached to the first hub. The invention can include a hub extension included in the first hub.

A joint can connect the first lighting assembly to the second lighting assembly in a lengthwise configuration. A first wiring clip can be attached to the first lighting assembly and a second wiring clip can be attached to the second lighting assembly wherein the first wiring clip and the second wiring clip define an electrical connection between the first lighting assembly and the second lighting assembly and are disposed in a tray defined in the joint. A threaded connector having a first threaded end attached to the first lighting assembly and a second threaded end attached to the second lighting assembly to can connect the first lighting connector and the second lighting connector. A first electrical connector can be carried by the first lighting assembly and a second electrical connector carried by the second lighting assembly configured to form an electrical connection between the first lighting assembly and the second lighting assembly.

The invention can include an initial connector removably connected between the external power supply and the first hub, a second extension cord removably connected between the first hub and the second hub, and a third extension cord removably connected between the second hub and the second light assembly.

The invention can include a third lighting assembly removably connected to the second hub. The first lighting assembly and second lighting assembly can be configured to reduce hot spots and dark areas by rotating the first lighting assembly and second lighting assembly in the sign housing. The power supply, first hub, first lighting assembly, second hub, and second lighting assembly can be connected in parallel in an electrical circuit. A third lighting assembly can be connected to an end of the second lighting assembly and in electrical communications with the second lighting assembly.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 3 is a side view of aspects of the invention;
FIG. 4 is an end view of aspects of the invention;
FIG. 22A is a bottom view of aspects of the invention;
FIGS. 22B and 22C as wiring schematics;
FIG. 22D is a cross section of aspects of the invention; and,
FIG. 22E is a perspective view of aspects of the invention.

DETAILED DESCRIPTION OF A PREFERRED EMBODIMENT

Figure 1A:
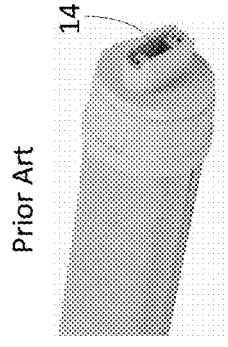
FIGS. 1A and 1B are perspective views of the prior art.
Figure 1B:
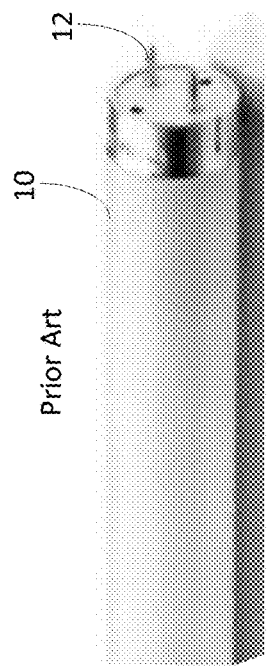

With reference to the drawings, the invention will now be described in more detail. Referring to FIG. 1A, a traditional fluorescent lamp 10 is shown having pin connectors 12. These pin connectors are received into a socket securing the fluorescent tube into a light fixture. The light generated can project generally 360° from the long axis of the tube. With this tube, the fluorescent tube can be used with a reflector to restrict the light production and can be used with an application needing 360° such as with illuminated signs. FIG. 1B illustrates another end connector 14 with recessed pins providing for electrical contact for the fluorescent tube.

Figure 2:
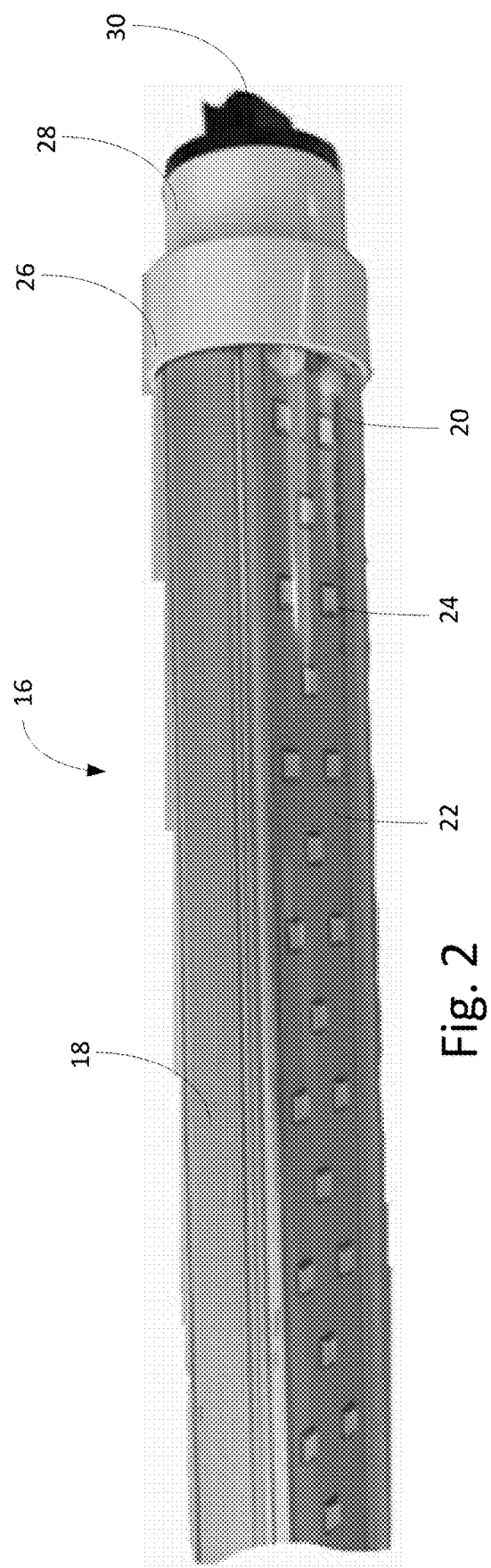
FIG. 2 is a perspective view of one end of aspects of the invention.

Referring to FIG. 2, a lighting assembly 16 is shown having a support structure 18 that can have attached to it a clear cover 20 that can cover a LED strip 22. The LED strip can include individual LED lamps 24 that can be arranged in a linear fashion, in a single, or a multiple row configuration and can be in an offset configuration. A fixed cap 26 can be attached to the support structure and cover the ends of the support structure and/or the clear cover. A cavity can be defined in the support structure to contain wiring and electronics. A rotatable cap 28 can be attached to the fixed cap so that the rotatable cap can rotate about an axis perpendicular to the long axis of the support structure. The rotatable cap can include a stop to prevent the rotatable cap from rotating more than 360°. An end connector 30 can be attached to the rotatable cap.

Referring to FIG. 3, the support structure 18 is shown with a first LED strip 32 carried by the support structure. The LED lamps are facing outward in relation to the support structure. A second LED strip (not shown) can be carried by the support structure and disposed on the opposite side of the support structure. Its LED lamps can be facing outward in a direction about 180° to the light projection direction of the LED lamps of the first LED strip. Wiring 34 can be attached to each LED strip representing the power and ground components of the circuit including the LED strips.

Referring to FIG. 4, an end of the support structure and the first and second LED strips is shown. Support structure 18 can include ridges 36 on opposing ends of the support structure to improve handling of the assembly. An LED slot 38 can be defined in the support structure for receiving the LED strip 22. A wire opening 40a and 40b defined in the LED strip and the support structure respectively to allow the wiring of the LED strips to attached to the outer side of the LED strip and also be positioned in the cavity 42 defined in the support structure. Internal extensions 44 can extend into the cavity to provide for an attachment point to secure the fixed cap to the support structure. In one embodiment, the internal extension can include a threaded opening 46 for receiving a screw that can extend through the fixed cap and into the support structure.

Figure 5:
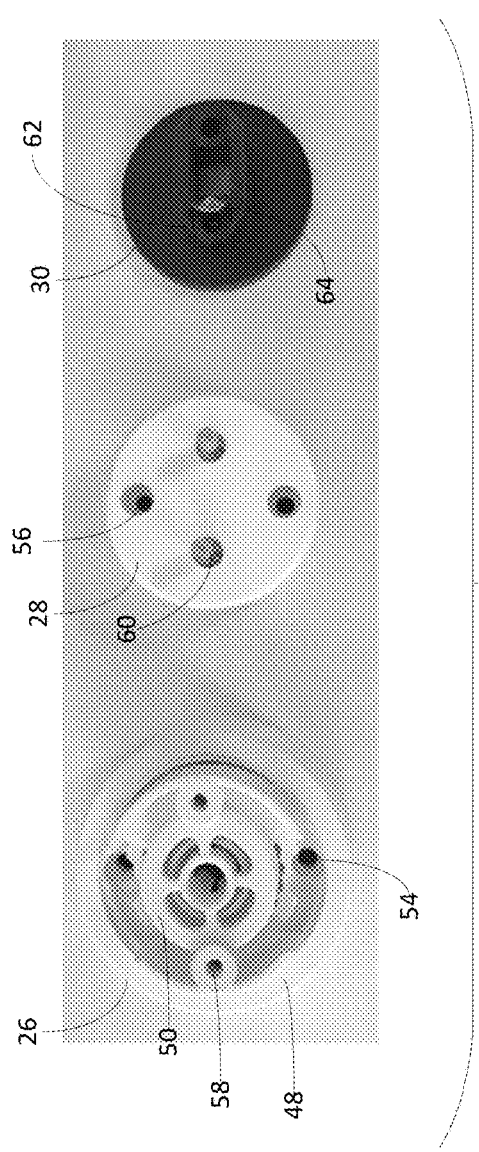
FIG. 5 is a top view of components of the invention.

Referring to FIG. 5, the cap is shown having a fixed portion 48 and a rotatable portion 50. The rotatable portion can rotate about the fixed portion. The fixed cap can be attached to the support structure with screws that are received in to opening 54 so that the fixed cap cannot rotate relative to the support structure. The rotatable cap 28 can be attached to the rotatable portion of the fixed cap by screws that are received into opening 56 and are secured to the rotatable portion of the fixed cap by opening 58. A pin 60 is included in the rotatable cap providing electric communications from a power source to the LED strip. The end connector can include an opening 62 for receiving the pin and allowing the pin to be in electric communications with a contact 64. The end connector can be removable so that the rotatable cap can be used with a power source socket having openings or contacts.

Figure 6:
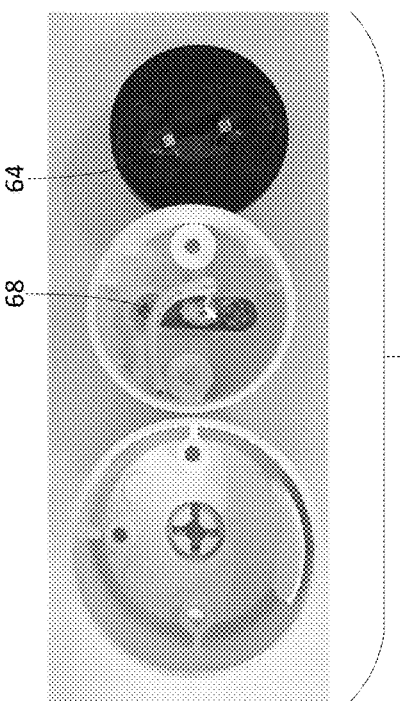
FIG. 6 is a bottom view of components of the invention.

Referring to FIG. 6, the inward facing side of the various ends caps is shown. The rotatable cap includes wiring and a pin connector 69 that can be the power or ground for the circuit of the invention with the opposing rotatable cap having the corresponding wiring. Contact 64 can provide electric communications between the rotatable wiring, pin connector, and power source to provide power to the electrical circuit of the invention.

Figure 7:
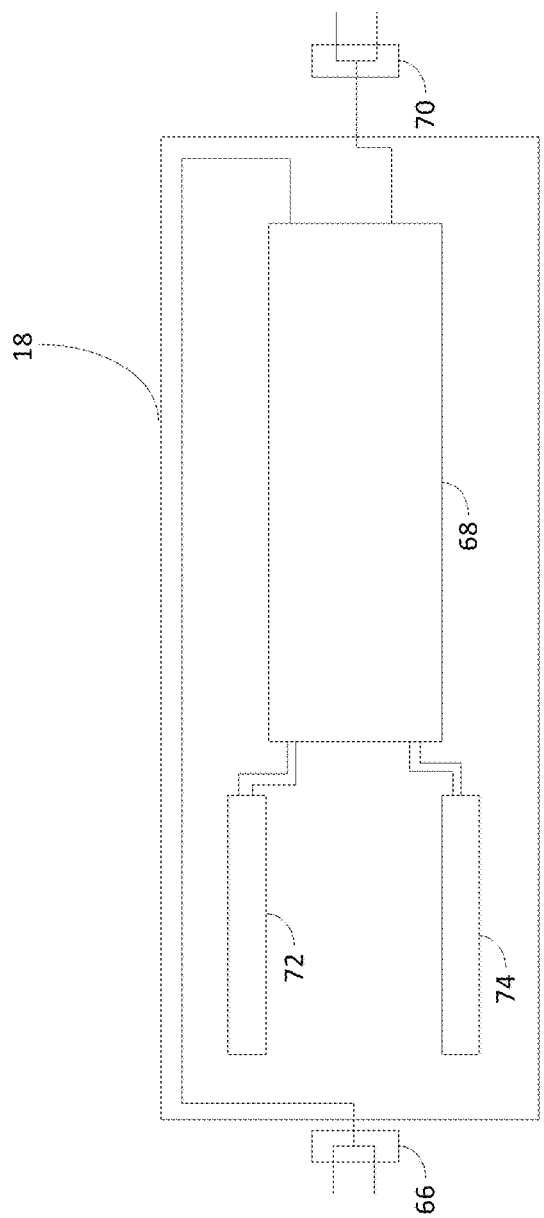
FIG. 7 is a schematic of aspects of the invention.

Referring to FIG. 7, a first end cap assembly 66, having the fixed cap and the rotatable cap, is shown in electric communications with LED driver 68. A second end cap 70 is shown in electric communications with the LED driver. When power is applied to the first end cap and the second end cap, the driver can convert the applied power to a level that can be transmitted to the first LED strip 72 and the second LED strip 74. The cavity defined in the support structure 18 can receive driver, wiring, and LED strips so that the assembly is self-container and can be placed in the pre-existing light fixture. In one embodiment, the light fixture can be modified to remove the ballast from the preexisting fluorescent fixture so that the pre-existing light fixture need only provide power to the assembly.

Figure 8:
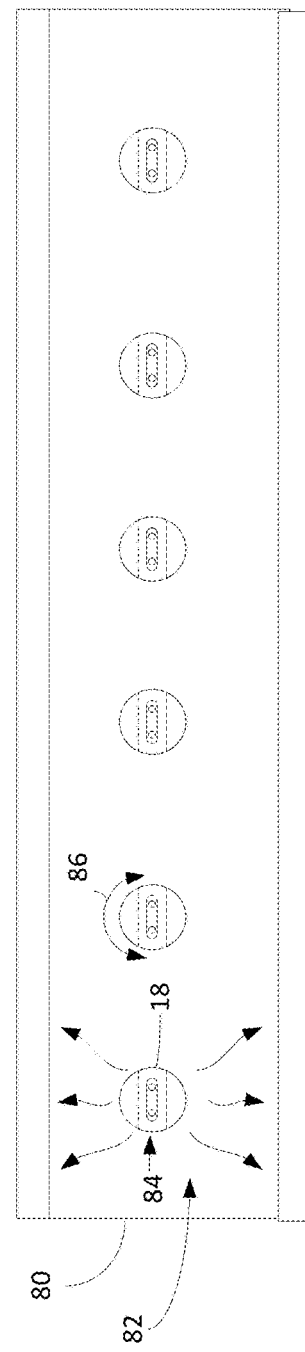
FIG. 8 is an edge view of aspects of the invention.

Referring to FIG. 8, a top down view of the light assembly is shown in a pre-existing lighting fixture such as with a lighted sign. The lighted sign housing 80 can include a light source area 82 that is disposed in the housing. The lighting source, traditionally, fluorescent tubes, can be substituted with the LED assembly 84 of the present invention. The support structure 18 causes the light projection to be toward a first side and a second side within the housing. The rotatable cap allows the light projection to align with the front and rear side of the lighted sign housing allowing the LED assembly to rotate in a direction shown as 86.

Figure 9:
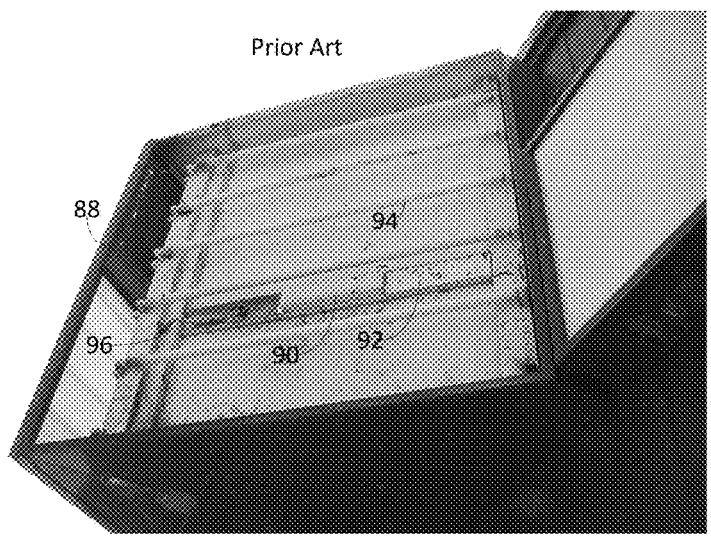
FIG. 9 is a perspective view of the prior art.

Referring to FIG. 9, a sign housing 88 is shown having an interior compartment. In the compartment, there is at least a first ballast 90 and can be a second ballast 92 remaining from a prior installation. Fluorescent tubes 94 can be attached to the housing from a previous installation. The power to the wiring assembly and florescent tubes can originate externally from the housing and enter the housing at 96 or any other point in the housing. Traditionally, when replacing the sign, replacing bulbs, or otherwise modifying the sign, wiring assembly, or lighting assembly, it is necessary to discover where external power is originating and entering the sign housing, the wiring assembly, and circuit path that needs to be used, and the wiring structure of the new or modified florescent lighting assembly. It would be advantageous to have a replacement or repair system that would eliminate the need to have a specific location for power entering the sign housing or to have to trace the existing wiring assembly in the sign. In one embodiment, the invention can include installing a power storage unit connected to an external power. The external power source can include a solar panel or a wind generator that can generate power stored in the power storage unit.

Figure 10:
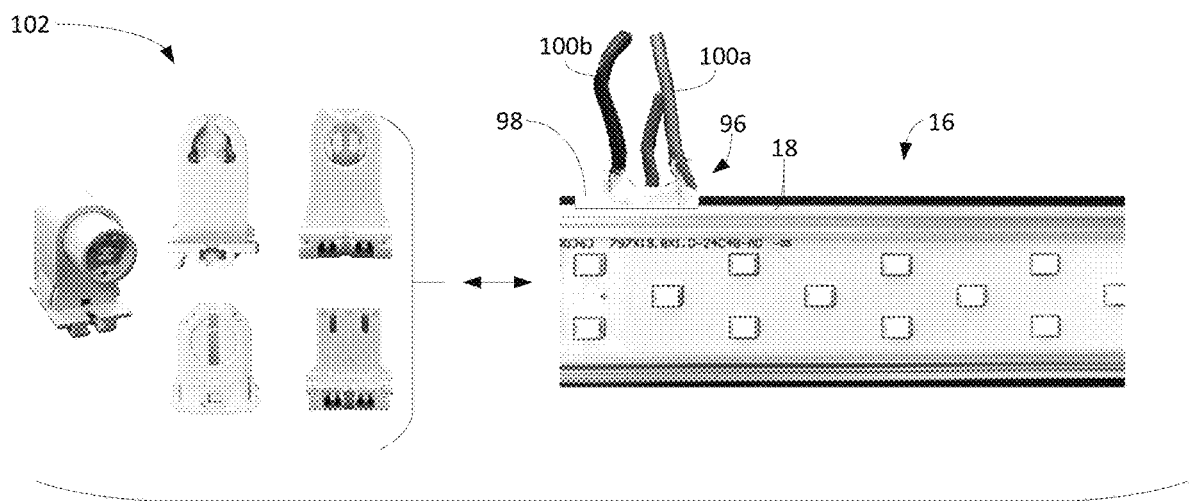
FIG. 10 is a perspective view of aspects of the invention.
Figure 11:
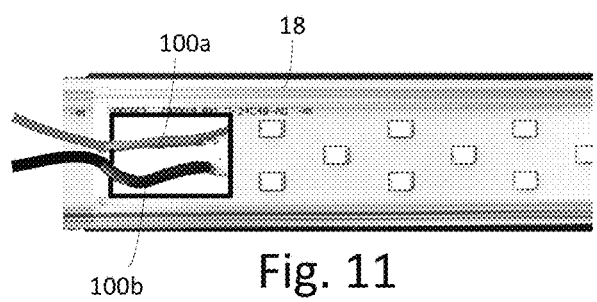
FIG. 11 is a side view of aspects of the invention.

Referring to FIG. 10, lighting assembly 16 having support structure 18 can include a slot 96 defined in the support structure or tube for allowing power leads 100a and 100b to extend from an internal cavity of the tube or support structure outward from the tube or support structure. Therefore, the tube can be supported by existing lamp holders 102 so that the power to the tube would not need to come from the lamp holder as is generally preformed in the prior art. Power would be supplied to the tube using the power leads and not with integrated connectors that are attached to the ends of the tube. The slot can be in the support structure 18 or arranged in or adjacent to the LED strip as shown in FIG. 11. With these arrangements, the power can be supplied to the LED strip without the need for conductive end caps.

Figure 12A:
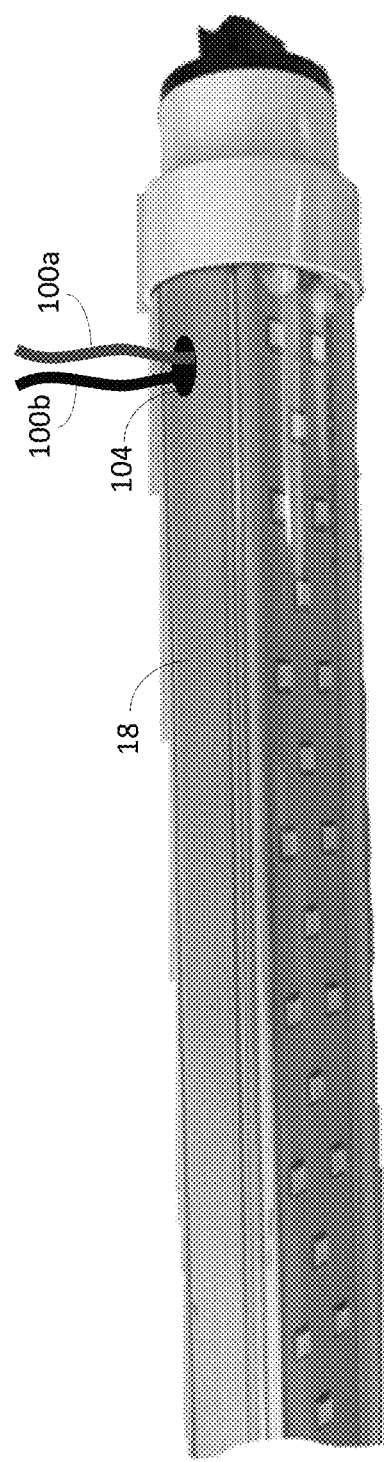
FIGS. 12A and 12B are perspective views of aspects of the invention.
Figure 12B:
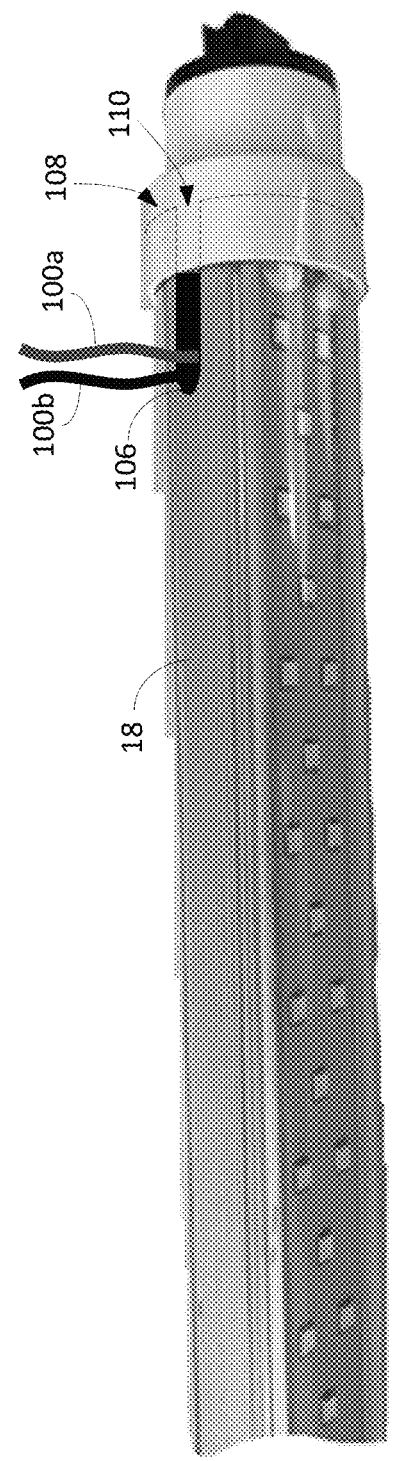

Referring to FIG. 12A, one embodiment is shown with an opening 104 defined in the support structure 18. Therefore, the power leads 100a and 100b are disposed inward from the fixed cap and can provide power to the LED strip without connectors being attached to the end caps or connectors. Referring to FIG. 12B, one embodiment includes an opened ended slot 106 defined in the support structure or LED strip that extends to the edge 108 of the support structure or LED strip defining an opening 110 in the support structure or LED strip. The opened ended slot allowed for the driver to be placed in the support structure, the power lead to be disposed in the open-ended slot and the fixed cap to be placed on the end of the support structure. Therefore, the power leads need not be threaded through an opening which can simplify assembly. Once the fixed cap is placed on the support structure, the power leads are prevented from sliding out of the open-ended slot at opening 110.

Figure 13:
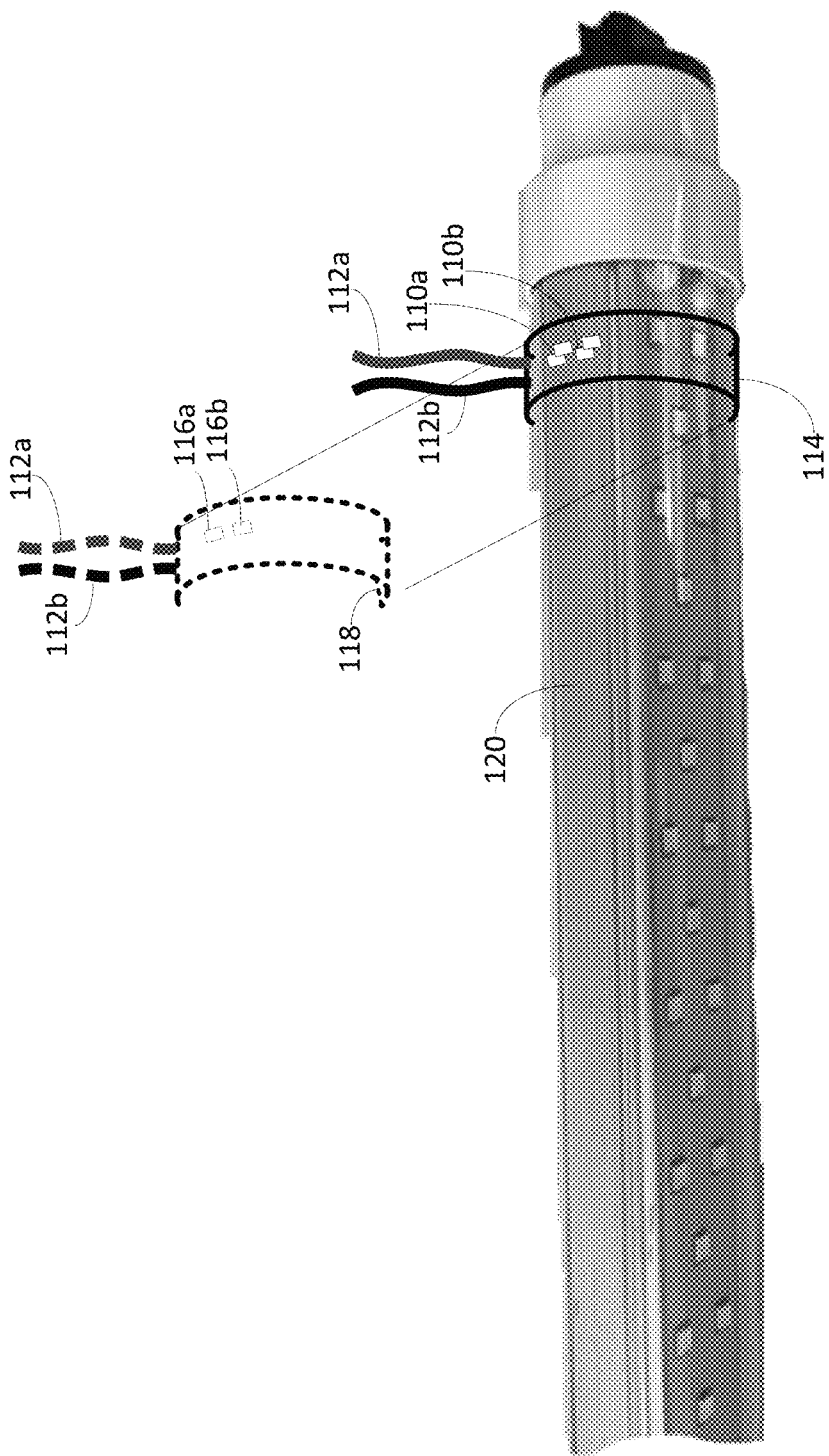
FIG. 13 is a perspective view of aspects of the invention.

Referring to FIG. 13, one embodiment includes support structure contacts 110a and 110b that are attached to the support structure and internally attached to the driver and/or LED strip so that when the support structure contacts are energized, power is provided to the driver and/or LED strip and light is provided. In this embodiment, the power leads need not extend through the support structure allowing for the support structure to be more environmentally sealed, such as water resistant, waterproof, air proof, dust resistant, dust proof, and the like. To provide power to the support structure contacts, external power leads 112a and 112b are attached to a clip 114. The clip can be, disposed on an internal surface, clip contacts 116a and 116b. When the clip is placed on the support structure, the clip contacts are in electrical communication with the support structure contacts allowing power to be transferred from the external power leads to the driver and/or LED strip. When the caps are placed on the end of the support structure, a water resistance seal can be included in the caps and without the power leads extended through the support structure, the integrity of the support structure is maintained. The clip can include a ridge 118 that can engage with grooves 120 in the outer wall of the support structure to assist with keeping the clip in place.

Figure 14:
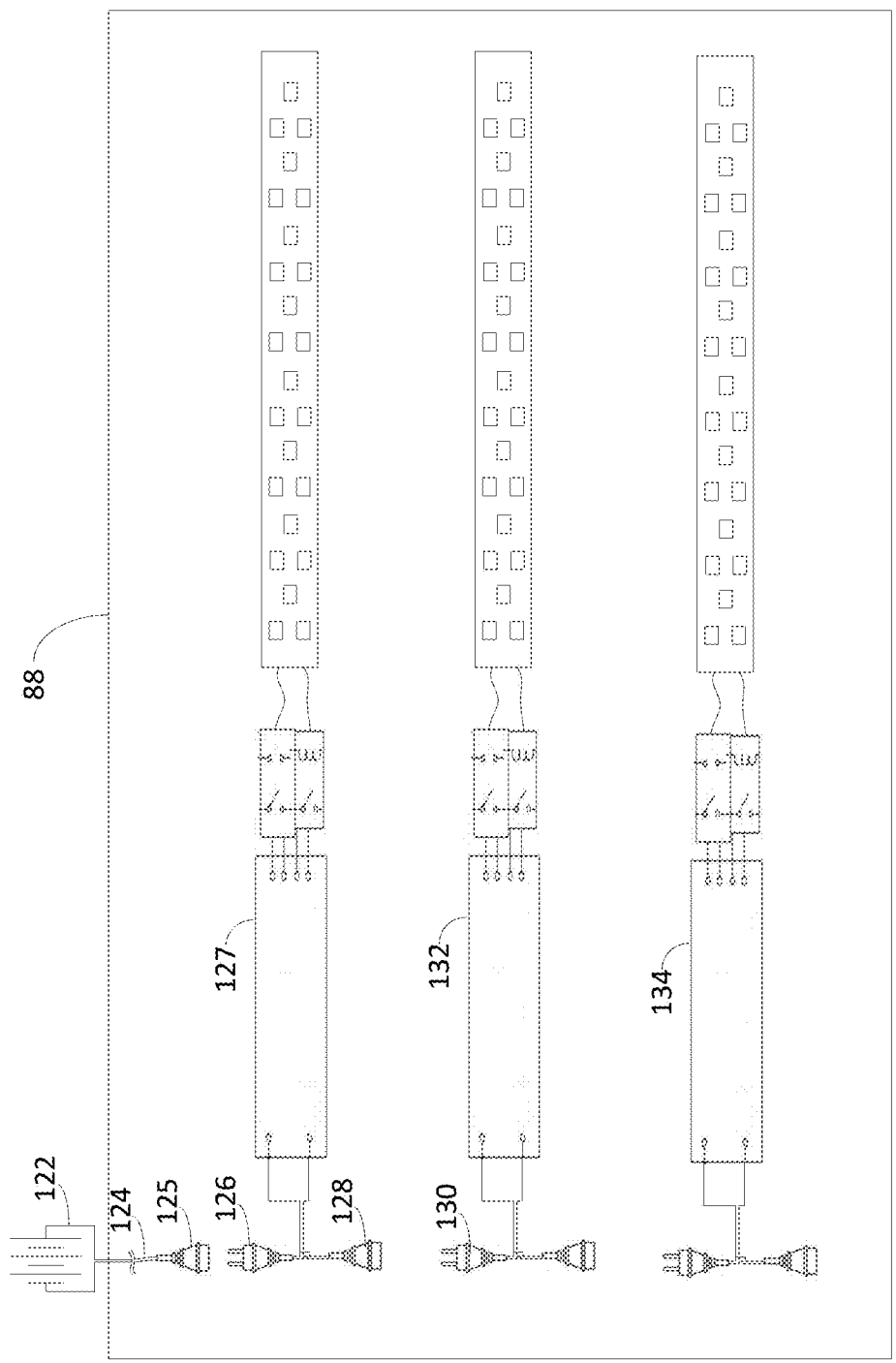
FIG. 14 is a schematic of aspects of the invention.

Referring to FIG. 14 a schematic of the invention is shown with the sign housing 88 and external power source 122 with external power leads 124 extend from the external power source to the interior of the sign housing. The external power leads can be connected to an initial connector 125. When repairing, modifying, or replacing the lighting assembly or assembly in the sign assembly, the existing wiring assembly need not be review or even understood, only where the external power leads enter the interior of the sign housing so that initial connector 125 can be attached to the external power leads needs to be known. Once this is performed, the first light connector 126 can be attached to initial connector 125 and a first lighting assembly 127. A second light connector 128 can be wired in parallel to the first light connector which can then be connected to a second light connector 130 of a second lighting assembly 132. The process can be repeated for a third lighting assembly 134. With this arrangement, the external power can be connected to one lighting assembly and the existing wiring or wiring assembly need not be of concern.

Figure 15A:
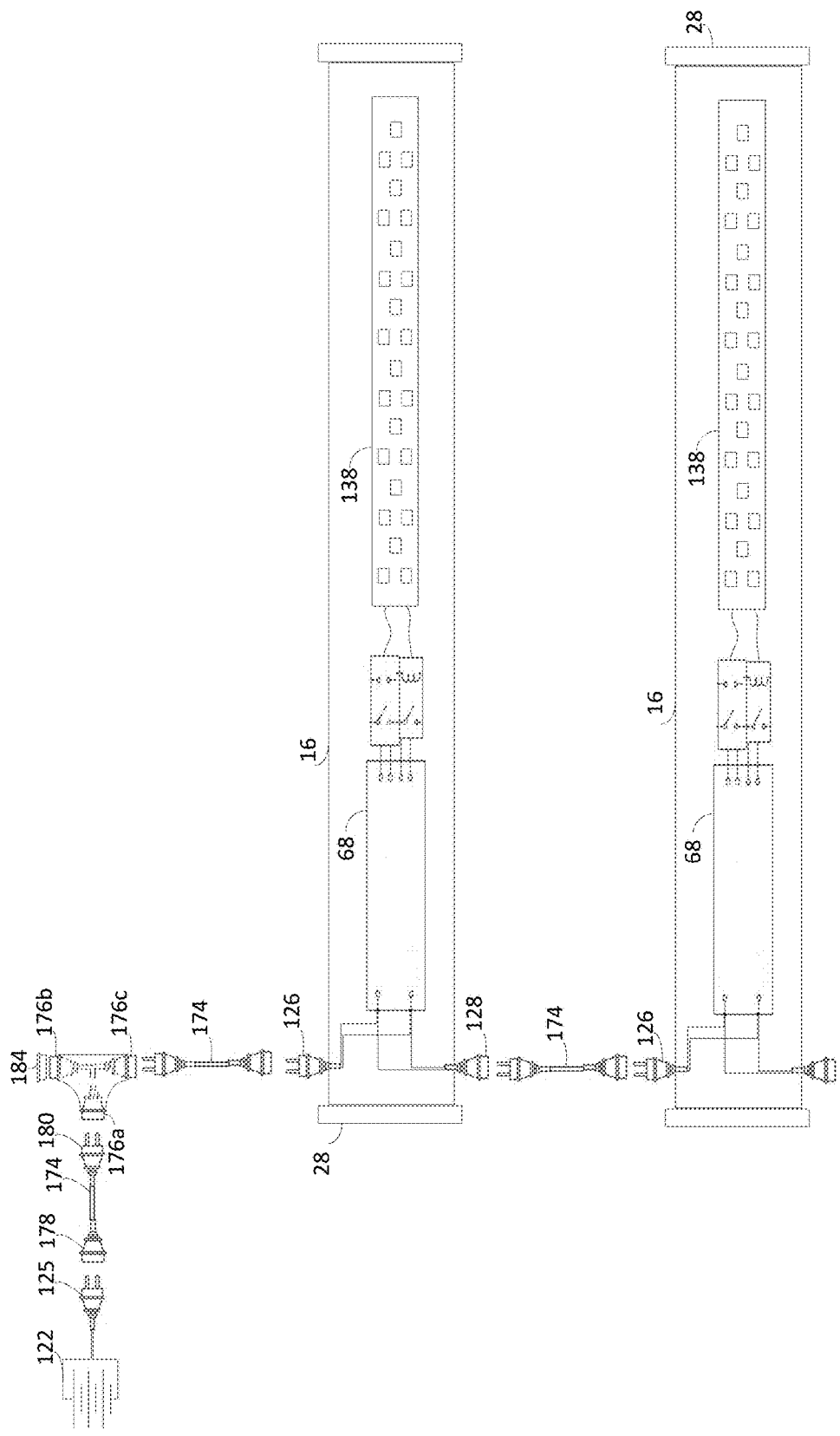
FIG. 15A through 15C are schematics of aspects of the invention.
Figure 15B:
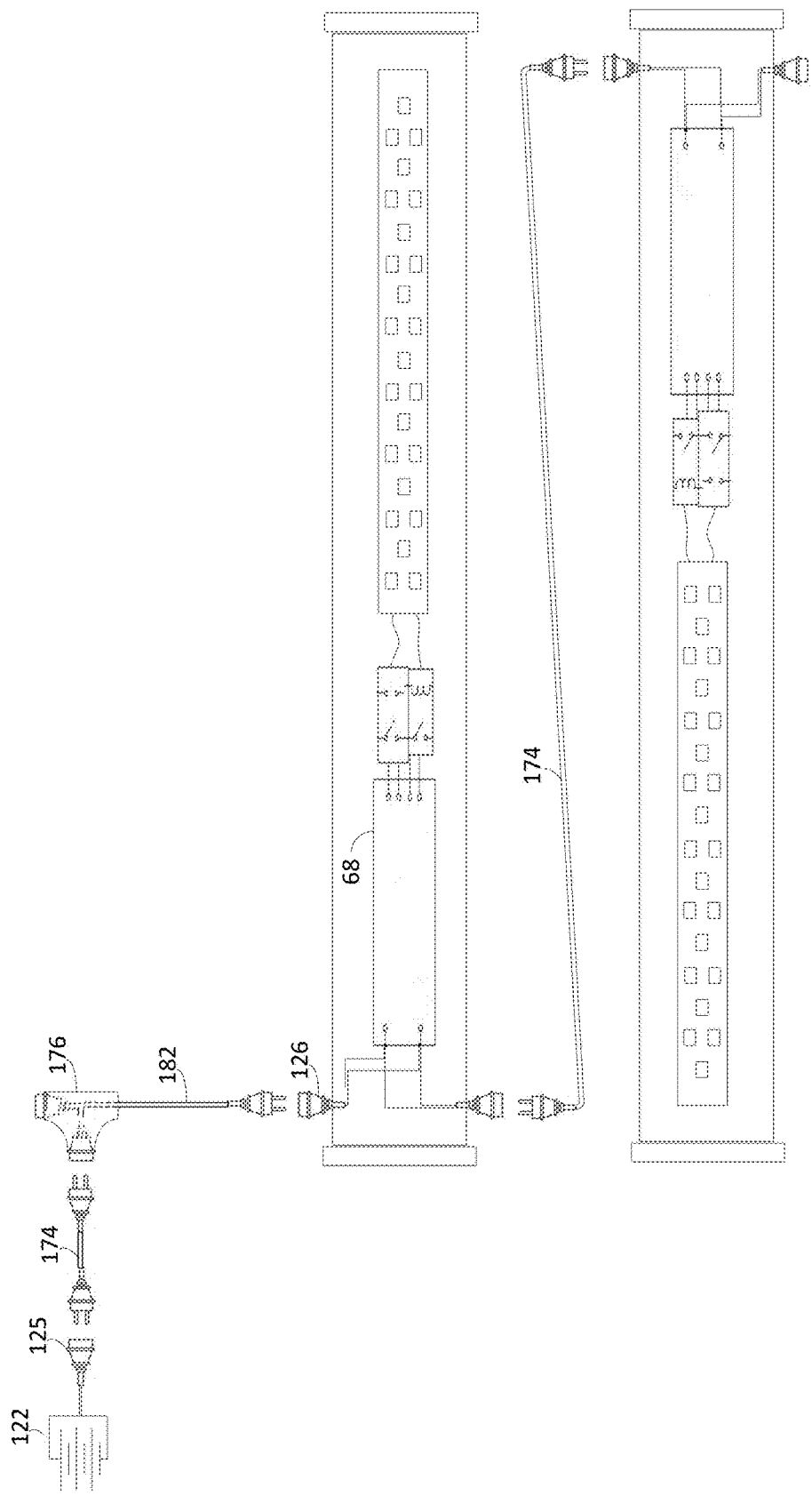
Figure 15C:
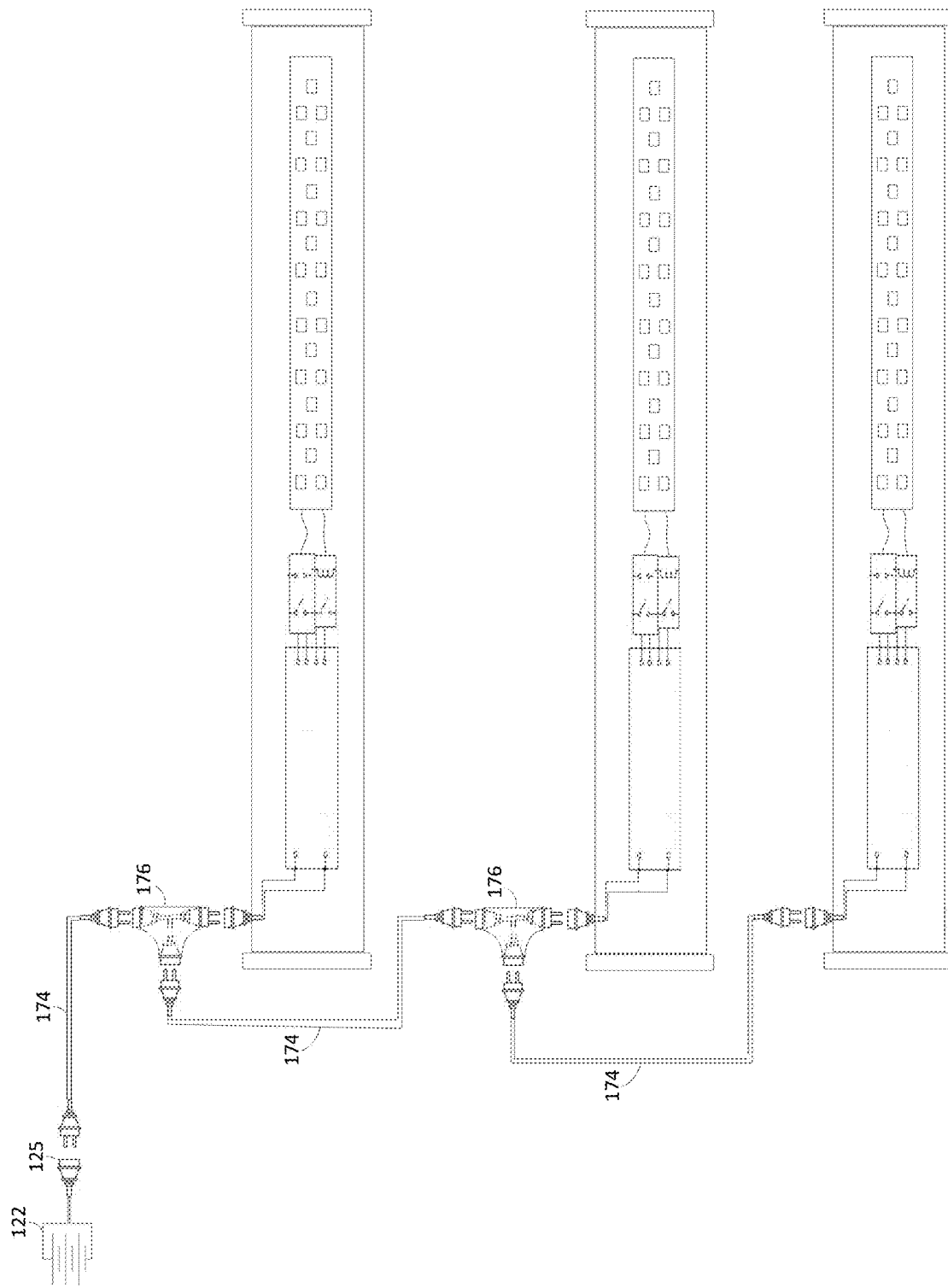

Referring to FIGS. 15A through 15C, the external power source 122 can include an initial connector 125. The initial connector allows the installer to simply find the external power and attach the initial connector without having to remove, trace, repair, replace or otherwise use the existing wiring in the sign housing. An extension cord 174 can be attached between the initial connector and a hub 176. The hub can include a central connector 176a, a first hub connector 176b and a second hub connector 176c. The hub can then be connected to lighting assembly 16 by extension cord 174 being used attached between the hub 176 and the first light connector 126. The light element can be connected to a second lighting assembly 132 using another extension code 174a that connects between the lighting assembly 16 and second lighting assembly 132. The first light connector 126 and the second light connector 128 are positions, configured or arranged to allow the light element to rotated about its long axis. In one embodiment, the rotation is 270 degrees or less. The extension cord 174 can include the same connects on each end that engaged with the initial connector and the light element so that either end of the extension cord can be used or can include a first extension end 178 and a second extension end 180 requiring a specific orientation to connects the external power supply and the light elements.

The hub 176 can include a hub extension 182 that can eliminate the need for an extension cord. The hub can be connected directly to initial connector or by use of an extension cord. The hub can be connected directly to the lighting assembly of by use of an extension cord. In one embodiment, the hub can be connected between the initial connector to the power supply and a single light connector of the light element. The hub can then be connected to a second light element, also having a single light connector. The hub allows multiple light connectors to be attached to each other in parallel or series. If there is an end of the hub, extension cord, or hub extension that is not being used, a cap 184 can be placed on the connector to protect the connector and prevent debris and fluid from entering into the hub, extension cord or hub extension. The extension cord, hub, hub extension, and light connectors can be male ends or female ends in any combination configured to allow the various components to be connected to form a completed electrical circuit. The various connections can be press fit, snapped, detent or threaded connections.

Figure 16A:
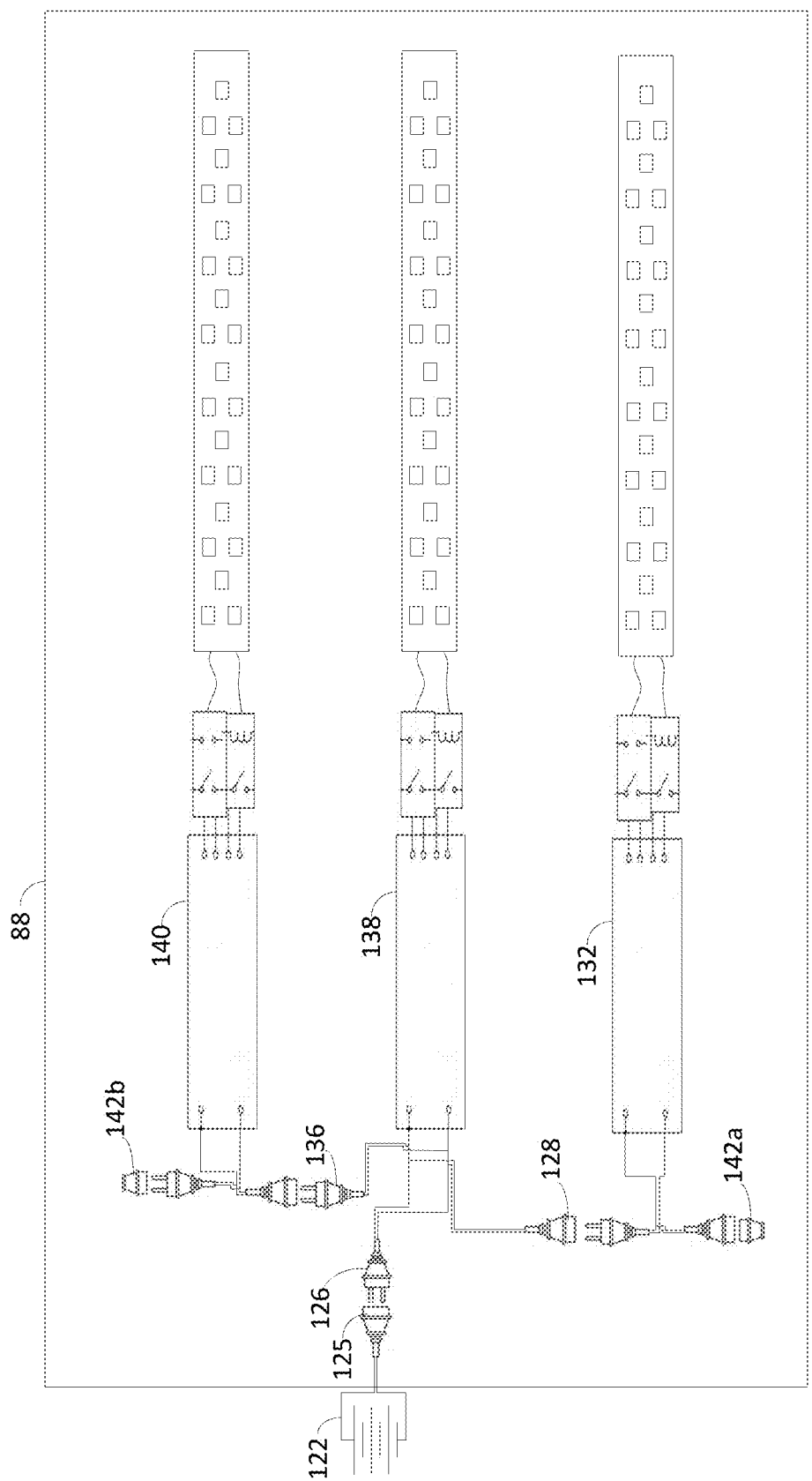
FIGS. 16A and 16B are schematics of aspects of the invention.
Figure 16B:
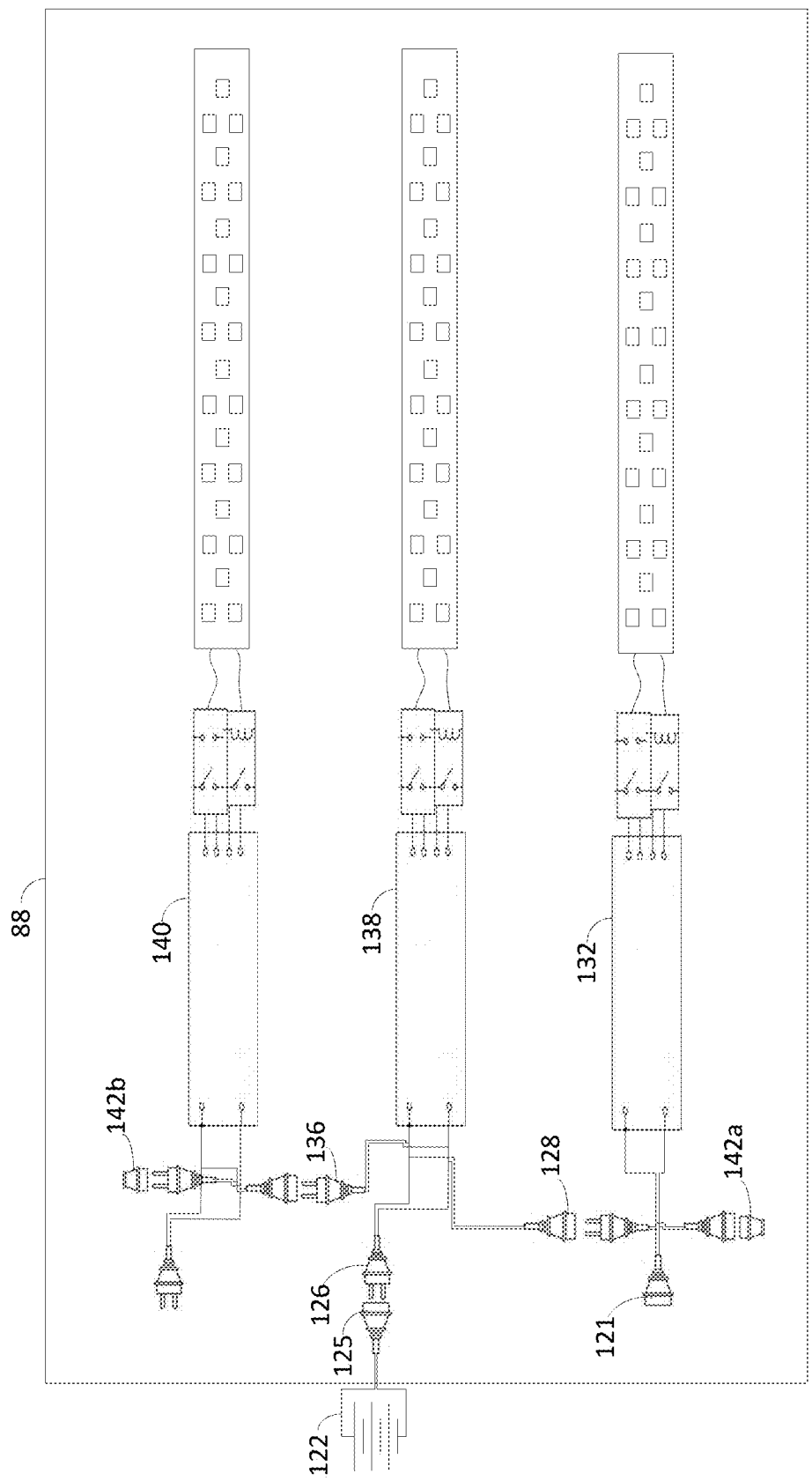

Referring to FIGS. 16A and 16B, one embodiment is shown where the first light element 138 includes a first light connector 126 connected to the external power source, a second light connector 128 can allow the first light connector to be connected to a second lighting assembly 132. A third light connector 136 can be wired in parallel with the first and second light connectors allowing for a third lighting assembly 140 disposed on the opposite side in relation to the second lighting assembly 132 to be attached to the first light element 138. Each light element can include all three light connectors. For the connectors that are not being used, there can be a connector cap 142a or 142b that can be used to terminate the end of a loose connector as well as serve as an electrical circuit termination. In one embodiment, the loose connector need not be electrically terminated as the connectors are arranged in parallel. With this configuration, multiple light elements can be attached and disposed on a sign housing according to the number of sign elements desired and the size of the sign housing. The connectors can have one or two lines running front the lighting assembly. In one configuration, the lines have two male and one female end as shown connected to third lighting assembly 140 (FIG. 16). In one configuration, the lines have two female and one male end as shown connected to second lighting assembly 132 (FIG. 16).

Figure 17:
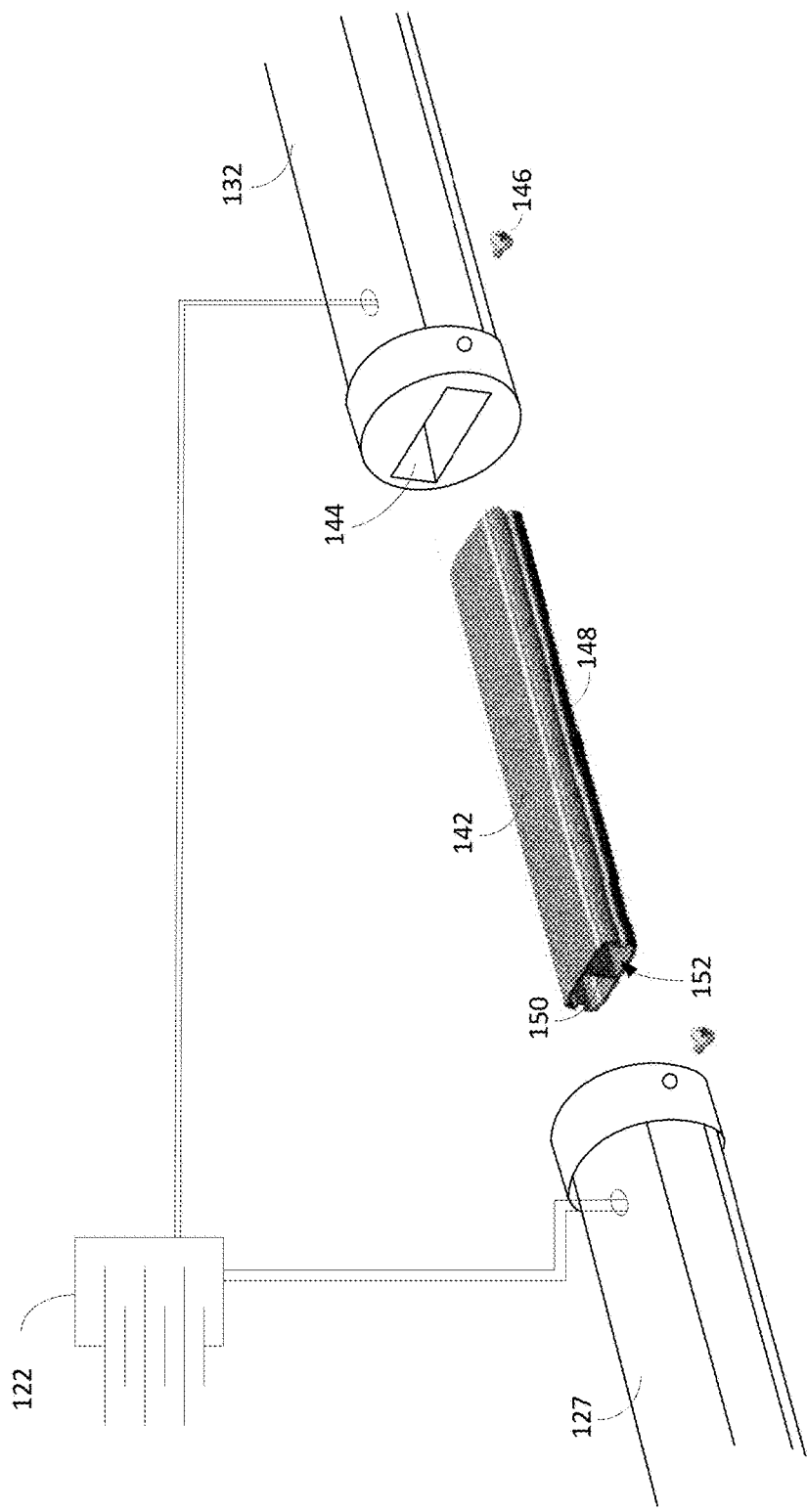
FIG. 17 is a perspective view of aspects of the invention.

Referring to FIG. 17, the lighting assemblies can be connected to each other resulting in an extended lighting assembly that is the length of the connected lighting assembly. A first lighting assembly 127 can be attached to the external power source 122 and the second lighting assembly 132 can be attached to the external power source 122. Additional lighting assembly can be attached to the first lighting assembly 127 so that each lighting assembly attached to the first lighting assembly is powered by the external power supply by being connected in parallel or series to each other. Additional lighting assembly can be attached to the second lighting assembly 132 so that each lighting assembly attached to the first lighting assembly is powered by the external power supply by being connected in parallel or series to each other. In one configuration, the first power light element can be attached to the external power supply and the second lighting assembly can be attached to the first lighting assembly so that only one lighting assembly needs to be attached to the external power supply. A joint 142 can be used to connect two lighting assemblies. The two lighting assemblies can be connected end to end in a lengthwise configuration. One end of the lighting assembly can include a joint opening 144 that can receive the joint. The joint can be removably secured to the lighting assembly with friction fit, detent, clip, fastener 146, or any combination thereof. The fastener can apply force to the joint or can extend into the joint to secure the two-lighting assembly together. The joint can include a slot 148 that can receive the fastener or otherwise be configured to secure the two-lighting assembly tougher. The joint can include an internal joint brace 150 to support the joint when it is received in the lighting assembly. The joint can also include one or more openings 152 extending the length of the joint. Lighting assembly length can include lengths in the ranges about 105 to 123 inches. When two light elements are joined without an electrical connection being included in the joint 142, the light elements can be electrically connected together using the structures and function described herein.

Figure 18A:
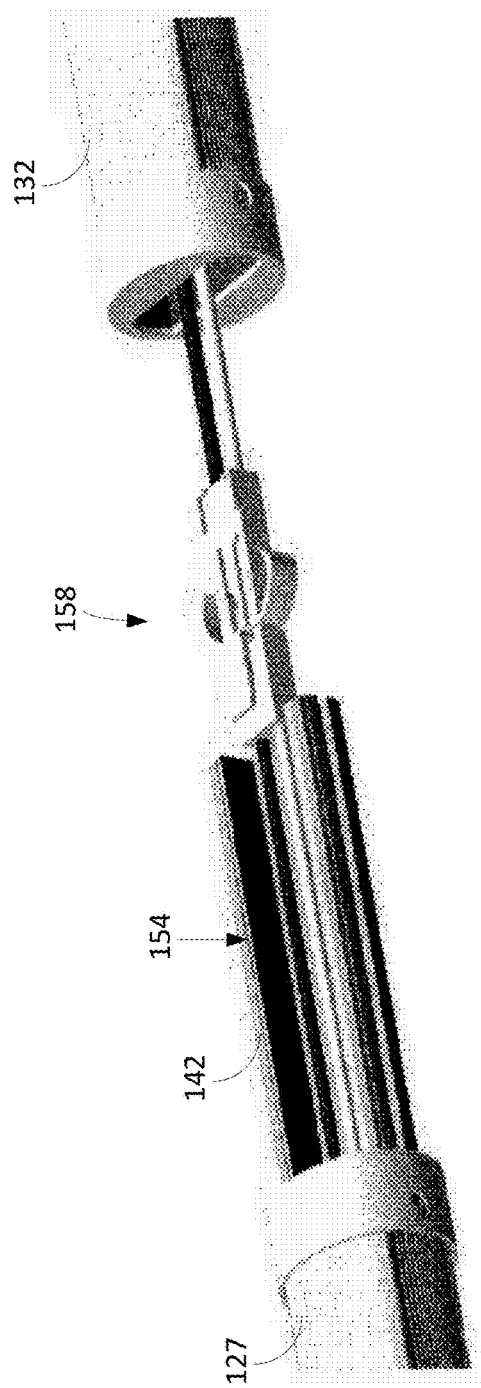
FIGS. 18A and 18B are perspective views of aspects of the invention.
Figure 18B:
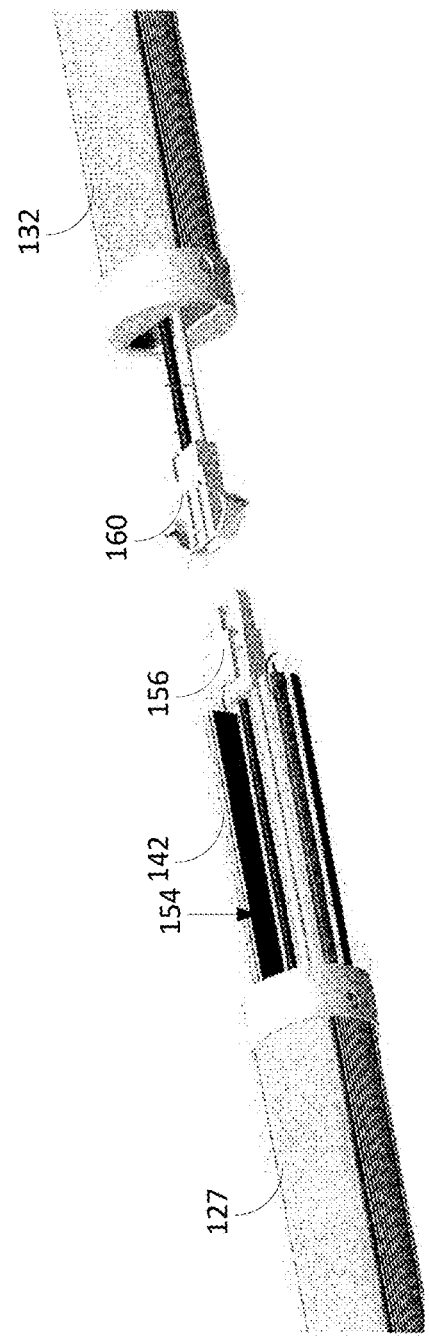

Referring to FIGS. 18A and 18B, joint 142 is shown received into first lighting assembly 127. The joint can include a "U" cross section having an open side 154 to define a tray within the joint. The tray can receive wiring that can extend from one end of the lighting assembly to the other end. The wiring of the first lighting assembly 127 can be attached to a first wiring clip 156 included in a wiring clip assemble 158. Wiring included in the second lighting assembly 132 can be attached a second wiring clip 160 included in a wiring clip assemble 158. The first wiring clip and the second wiring clip can be removably connected or can be one time connected. The wiring clip assembly allowed power from the external power source connected to the first lighting assembly to be delivered to the wiring of the second lighting assembly so that the first and second lighting assembly are powered when connected. The wiring clip assembly can be disposed on the tray of the joint allowing the first lighting assembly and the second lighting assembly ends to be flush when connected.

Figure 19:
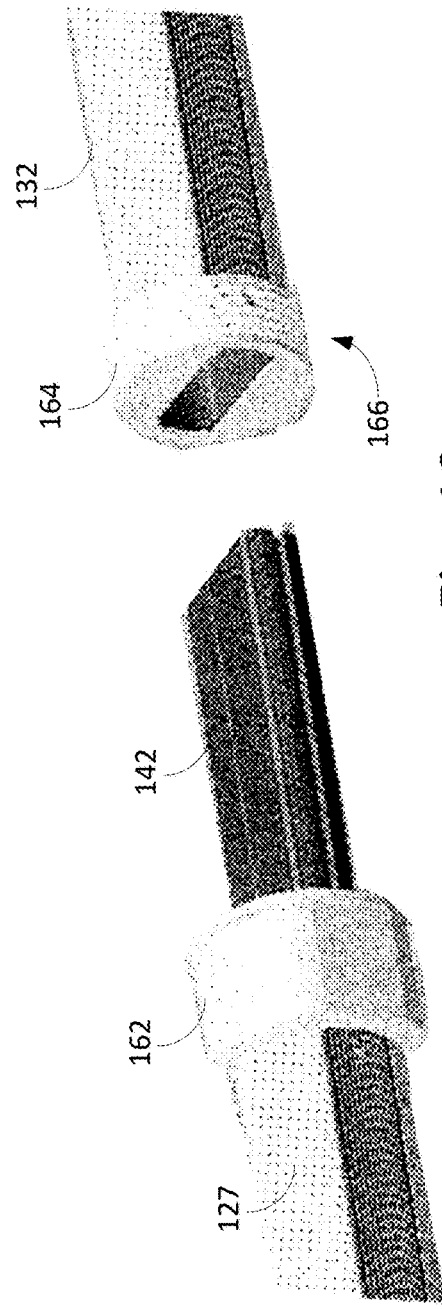
FIG. 19 is a perspective view of aspects of the invention.
Figure 20:
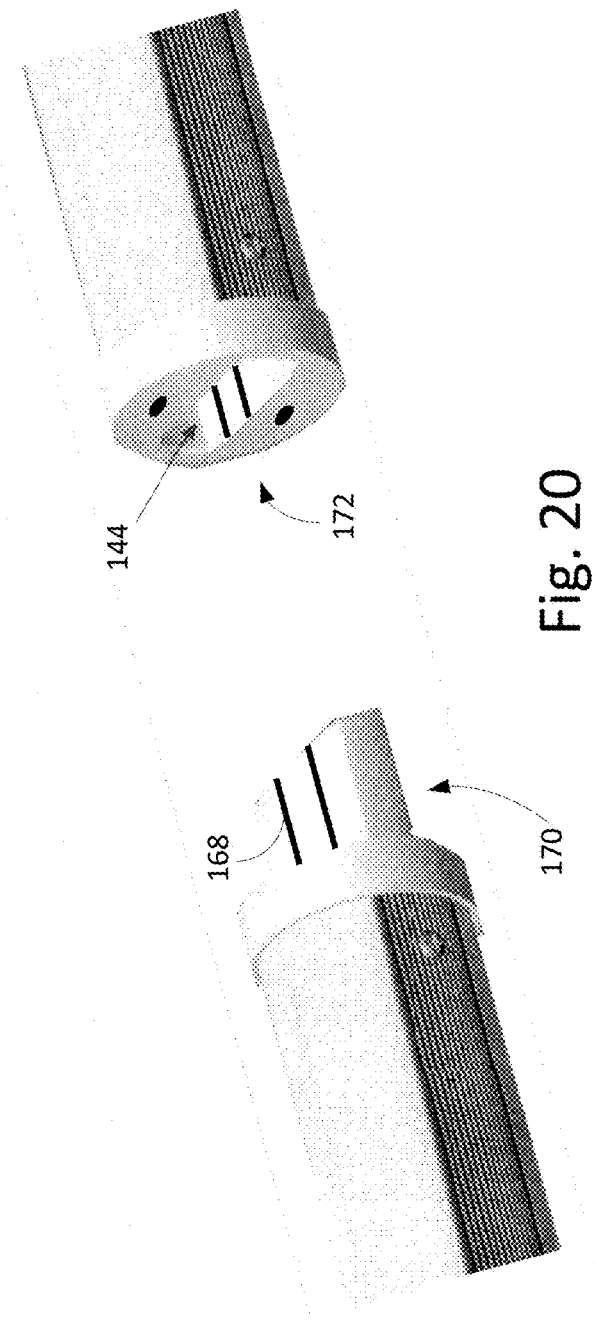
FIG. 20 is a perspective view of aspects of the invention.

Referring to FIG. 19, the first lighting assembly 127 can receive the joint. The second lighting assembly 132 can then receive the joint. The first lighting assembly can include a first threaded end 162 of a threaded connector. The second lighting assembly can include a second threaded end 164 of the threaded connector. When the first lighting assembly and the second lighting assembly receive the joint, the first threaded end and the second threaded end are connected securing the first lighting assembly to the second lighting assembly. The first threaded end can include threads on its interior surface. The second threaded end can include threads 166 on its exterior surface that engage with the thread of the first threaded connector. The threaded connector can be configured to removable connect to first lighted element to the second lighted element. The wiring and the wiring clip assemble can be disposed in the joint Referring to FIG. 20, electrical communications between the first lighting assembly and the second lighting assembly can be accomplished by first electrical connectors 168 being connected to the wiring of the first lighting assembly and disposed external on the first lighting assembly. The first lighting assembly can include a joint extension 170 that carried the first electrical connectors. When the joint extension in received in the second lighting assembly, the first electrical connectors can contact the second electrical connectors 172, connecting to the wiring of the second lighting assembly, in joint opening 144 so that the first lighting assembly can be in electrical communications with the second lighting assembly.

In one configuration, both the first lighting assembly and the second lighting assembly include electrical connectors in their respective openings. The joint can include joint electrical connectors that, when contacting the electrical connectors of the first lighting assembly and the second lighting assembly, provide for electrical communications between the first lighting assembly and the second lighting assembly.

Figure 21:
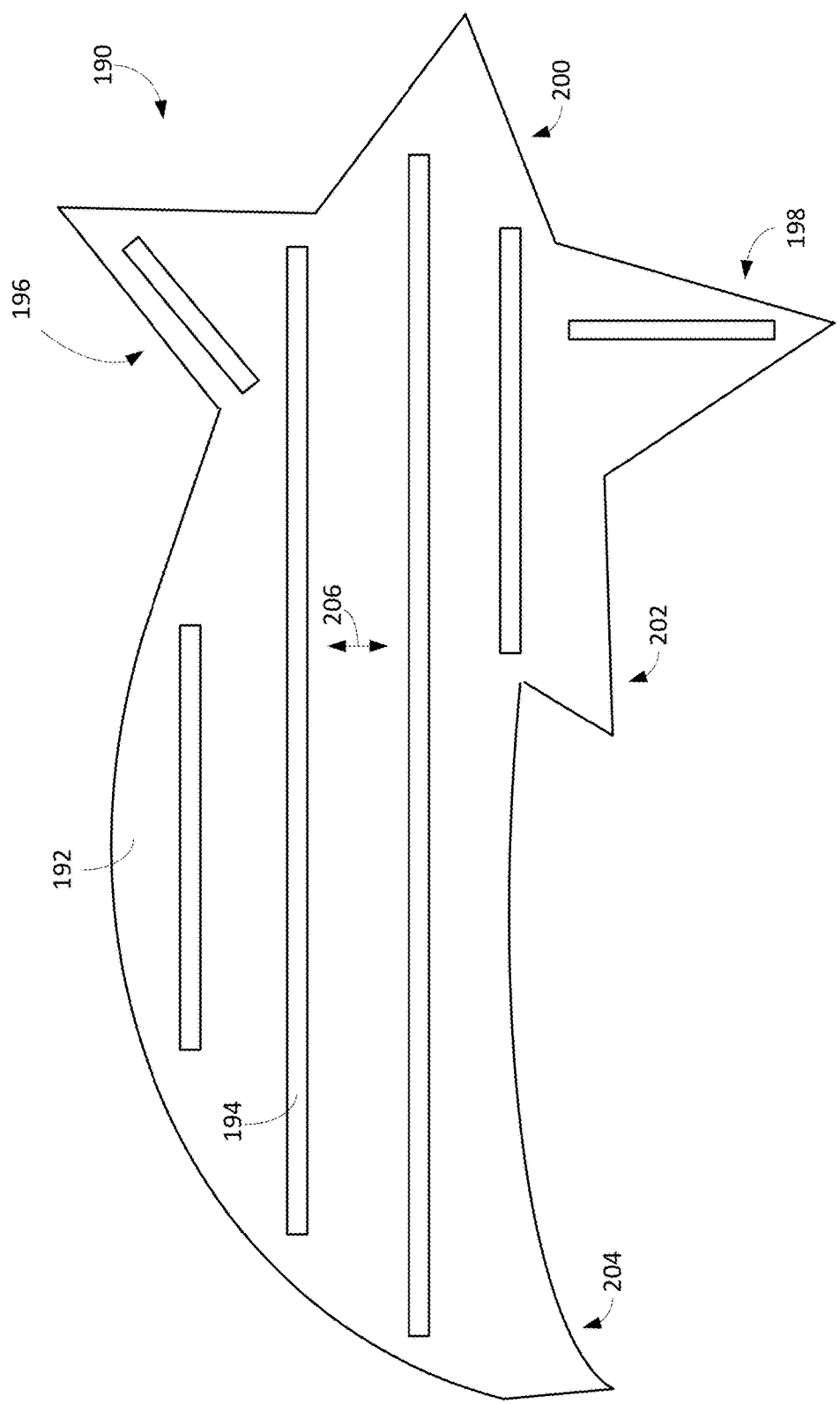
FIG. 21 is a front view of aspects of the invention.

Referring to FIG. 21, a sign body 190 is shown having a cavity 192 defined in the sign body for receiving light tubes. A cover can be placed over the sign body so that the printing or other designs on the cover is illuminated from the rear by the light disposed on the sigh bode. The sign tubes 194, being straight, cannot accommodate the curves and asymmetrical shapes of the sign body and create hot spots 196 and 198 as well as dark areas 200, 202 and 204. These hot spots and dark areas can be reduced an even eliminated by replacing the traditional tubes with the lighting assembly of the present invention and rotating the lighting assembly so that the light projects in a direction shown as 206 rather than in 360° as with transitional lighting. Further, because each individual lighting can rotate, each lighting assembly optimally positioned to reduce or eliminate hot spots of dark areas.

Referring to FIGS. 22A through 22F, the structure for the replacement of traditional lengthy fluorescent tubes with shorter tubes is shown. The system for converting these light assemblies, and other styles, includes an adapter plate 208. The original lighting installation is dissembled with only the housing, reflector, mounting assembly, or some combination remaining. The wiring, 210 is removed from the original light assembly. The replacement wiring assembly 212 for a replacement such as a set of four-foot T8 lamps to replace a set of two T12 8-foot lamps is installed. The replacement wiring can contain or omit ballast 214. In some embodiment, the replacement components can be for lighting sources that either do not require a ballast or have the ballast incorporated in the replacement lighting source. In one embodiment, wiring for the four-foot T8 lamps is attached to the it is attached to housing, mounting assembly, disposed in a channel of any combination. The adapter plate includes a first end 216 that includes a set of openings 218 for receiving lamp holders. The openings can be a set of opening for two lamp holders or a single opening for receiving two lamp holders. Attachment opening 220 can be included that can be used to secure the adapter plate to the mounting assembly, housing, reflector or any combination. The adapter plate can include a middle section 222. The middle section can include first end inside lamp holder openings 224 and second end inside lamp holder opening 226. Inside attachment openings 228a and 228b can be included in the middle section. A second end 230 can be included in the adapter plate that can have one or more openings 232 for receiving lamp holders and attachment opening 234. While the lamps can be of an original length 236, the adapter plate allows lamp holder to be positioned to hold lamp that are of a shorter length 238. In one embodiment, two 8-foot T12 are replaced by four 4-foot t* lamps.

A cross section along A-A is shown with the "U" cross section 240 of the adapter plate in one embodiment, and the lamp holders 242 extending from a channel area 246 defined between the adapter plate and the mounting assembly, externally through adapter plate to a lamp area 248. The adapter plate can be placed over the replacement wiring assembly, ballast and over at least a portion of the starter in one embodiment.

In one embodiment can include two lamp holders at the first and second ends. The middle section can include lamp holder that are designed to hold the end of two lamps each disposed about 180° to each other. By using these two types of lamp holders, the longer lamps such as the 8-foot T12 can be replaced with two shorter lamps such as 4-foot T8 lamps. The lamp holders are attached to the replacement wiring assembly, received in the adapter plate and the adapter place attached to the mounting assembly, housing, reflector or any combination.

In one embodiment, the adapter plate is designed to be used to replace 8-foot lamps with two 4-foot lamps. In order to facilitate the storage, shipping and handling of the adapter plate, the first section, middle section, second section or any combination can be removable attached to each other. In one embodiment, to facilitate the consistency of the length of the adapter plate when installed, the sections are slideably connected at one or more points. The connections can be disposed generally at any position along the adapter plate. In one embodiment, one section 250 can receive the adjacent section 252 and the two-section secured allowing the shorter sections to be stored and transported and assembled into an adapter plate that can a longer length than any one section and 8 feet or longer in one embodiment. A middle securing plate 254 can be included so that the first section and the second section attached to the middle securing plate providing for an adapter plate that is the length of the two attached sections. The plates and section described herein can include pre-drilled or pre-tapped holes so that the length of the assembled adapter plate can be consistently obtained. The various plates and section can include stops that allow the length of the assembled adapter plate to be consistently obtained. Two sections can also be joined with fish plates, cross plates connectors, "C" shaped brackets, "L" shaped brackets, and the like.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. While the invention is described herein with reference to several specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A lighting system for a sign comprising:
   a lighting assembly having a support structure, a cavity defined in the support structure, and an LED strip carried by said support structure;
   an end cap assembly including a fixed cap and a rotatable cap attached to an end of the support structure;
   an electrical connector included in said end cap engaging a light holder socket, wherein said light holder socket is connected to an external power supply and in electrical communication with said electrical connector;
   a driver disposed in the cavity and in electrical communications with the LED strip and said electrical connector of said end cap;
   wherein said lighting assembly is rotatable relative to said light holder socket and said driver is powered through said light holder socket.

2. The lighting system of claim 1 including a first LED strip disposed on a first side of the support structure and a second LED strip disposed on an opposite side of the support structure.

3. The lighting system of claim 2 wherein said first and second LED strips are in electrical communication with said driver.

4. The lighting system of claim 3 including a first end cap assembly disposed on a first end of said support structure and a second end cap assembly disposed on a second end of said support structure opposite said first end, wherein said first and second end cap assemblies each include a fixed cap secured to said support structure and a rotatable cap rotatably mounted to said fixed cap.

5. The lighting system of claim 4 including a first electrical connector included in said first end cap assembly, and a second electrical connector included in said second end cap assembly.

6. The lighting system of claim 5 including wherein said first electrical connector and said second electrical connector are in electronic communication with said driver.

7. The lighting system of claim 6 wherein said first end cap assembly engages a first light holder socket and said second end cap assembly engages a second light holder socket, wherein said first and second light holder sockets are each connected to an external power supply and in electrical communication with said first and second electrical connectors, respectively, for directing power to said driver.

8. The lighting system of claim 1 wherein said rotatable cap includes a stop to prevent the rotatable cap from rotating more than 360°.

9. The lighting system of claim 1 wherein said electrical connector of said end cap comprises at least one pin extending outward from said rotatable cap and engaging a slot of said light holder socket having a complementary electrical connector for providing electric communications from a power source to the LED strip.

10. The lighting system of claim 1 wherein said support structure includes a series of ridges disposed along an exterior surface between opposing side surfaces of said support structure, wherein said side surfaces are adapted to carry said LED strip, and wherein said ridges facilitate handling and rotation of said lighting assembly.

11. The lighting system of claim 10 wherein said opposing side surfaces include an LED slot for receiving said LED strip.

12. The lighting system of claim 1 including an internal extension disposed in said cavity providing an attachment point to secure said fixed cap to said support structure through a securing member extending from said fixed cap into said internal extension.

13. A lighting system for a sign comprising:
    an external power supply;
    a lighting assembly having a support structure, a cavity defined in the support structure, a driver received in the cavity, and an LED strip connected to the driver and carried by the support structure;
    a rotatable cap attached to an end of the lighting assembly and engaging a light holder of a sign housing and configured to allow the lighting assembly to rotate relative to the light holder;
    wherein said light holder is in electrical communication with said external power supply and said rotatable cap is in electrical communication with said light holder and said driver for powering said LED strip.

14. The lighting system of claim 13 where the lighting assembly is configured to reduce hot spots and dark areas by rotating the lighting assembly in the sign housing.

15. A lighting system comprising:
    a sign housing including a light holder socket connected to an external power supply for providing power to a lighting assembly carried by said light holder socket;
    said lighting assembly including a driver operatively controlling a LED strip
    a rotatable cap attached to an end of the lighting assembly configured to allow the lighting assembly to rotate relative to said light holder socket in said sign housing;
    wherein said light holder socket is in electrical communication with said external power supply and said rotatable cap is in electrical communication with said light holder socket and said driver for powering said LED strip.

\* \* \* \* \*